US008224682B2

(12) United States Patent
Sundstrom (10) Patent No.: US 8,224,682 B2
(45) Date of Patent: *Jul. 17, 2012

(54) METHODS, SYSTEMS, AND COMPUTER PROGRAM PRODUCTS FOR CALENDAR-BASED COVERAGE MONITORING

(75) Inventor: Robert J. Sundstrom, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,027

(22) Filed: May 16, 2011

(65) Prior Publication Data

US 2011/0218832 A1 Sep. 8, 2011

Related U.S. Application Data

(63) Continuation of application No. 11/644,043, filed on Dec. 22, 2006, now Pat. No. 7,949,554.

(51) Int. Cl.
*G06F 17/00* (2006.01)
(52) U.S. Cl. .................................................. 705/7.11
(58) Field of Classification Search .................. 705/7.11
See application file for complete search history.

(56) References Cited

U.S. PATENT DOCUMENTS

| | | | |
|---|---|---|---|
| 6,049,776 | A | 4/2000 | Donnelly et al. |
| 6,640,230 | B1 | 10/2003 | Alexander et al. |
| 6,988,128 | B1 | 1/2006 | Alexander et al. |
| 7,027,996 | B2 | 4/2006 | Levinson |
| 2002/0131565 | A1 | 9/2002 | Scheuring et al. |
| 2003/0129569 | A1 | 7/2003 | Callaway et al. |
| 2003/0154116 | A1 | 8/2003 | Lofton |
| 2004/0133440 | A1 | 7/2004 | Carolan et al. |
| 2006/0066448 | A1 | 3/2006 | Berisford et al. |
| 2006/0074740 | A1 | 4/2006 | Garcia et al. |

FOREIGN PATENT DOCUMENTS

JP 03-233676 8/2003

OTHER PUBLICATIONS

Consolvo, et al., "Computer-Supported Coordinated Care: Using Technology to Help Care for Elders," IRS-TR-03-017, Intel Corporation, pp. 1-10 (Dec. 2003).

Jih, et al., "Context-Aware Service Integration for Elderly Care in a Smart Environment," AAAI '06 Workshop—Boston, USA—Jul. 16-17, 2006, pp. 1-5.

Roesseler, et al., "Phase #2 of Computer-Supported Coordinated Care Project," IRS-TR-04-006, Intel Corporation, pp. 1-26 (Jan. 2004).

"Scheduling Software for Work Rosters & Shifts," [online] OzGrid [retrieved on Nov. 12, 2006] Retrieved from the Internet: <URL: http://www.ozgrid.com/shift-schedules/excel-scheduling-templates.htm> 5 pages.

(Continued)

*Primary Examiner* — Thomas Dixon (57) ABSTRACT

Methods, systems, and computer program products for calendar-based coverage monitoring are disclosed. According to one aspect, a method includes receiving a coverage rule defining at least one covering entity for performing an activity for a covered entity and at least one period of time during which the multiple covering entities is to perform the activity. Individual calendars for the at least one covering entity are monitored and a change in one of the calendars is detected. It is then determined whether the change causes the coverage rule to be violated, and in response to determining that the change causes the coverage rule to be violated, a notification indicating violation of the coverage rule is automatically generated.

32 Claims, 8 Drawing Sheets

OTHER PUBLICATIONS

Consolvo, et al., The CareNet Display: Lessons Learned From an in Home Evaluation of an Ambient Display, Intel Research Seattle, pp. 1-17 (Nov. 2004).

"Time Tracker," [online] Asgard Systems, Inc. [retrieved on Dec. 11, 2006] Retrieved from the Internet: <URL: http://www.asgardsystems.com/ttspec.html> 6 pages.

"Visual Staff Scheduler Pro 9.0," [online] Atlas Business Systems, Inc. Copyright 1995-2006 [retrieved on Dec. 11, 2006].

METHODS, SYSTEMS, AND COMPUTER PROGRAM PRODUCTS FOR CALENDAR-BASED COVERAGE MONITORING

CROSS-REFERENCE TO RELATED APPLICATIONS

The present application is a continuation of U.S. patent application Ser. No. 11/644,043, titled "Methods, Systems, and Computer Program Products for Calendar-Based Coverage Monitoring", filed Dec. 22, 2006, now issued as U.S. Pat. No. 7,949,554 on May 24, 2011, and commonly owned and herein incorporated by reference.

BACKGROUND

The subject matter described herein relates to coverage monitoring. More particularly, the subject matter described herein relates to methods, systems, and computer program products for calendar-based coverage monitoring.

In many environments, such as the home or office, individuals maintain schedules for the activities they perform. Typical schedules include responsibilities, such as working in an office, babysitting a child, or providing elder care. For different activities or time periods, different numbers of people may be available to perform an activity. In many instances, at least one person must be scheduled to perform the activity. The persons that are available to provide coverage for an activity are referred to herein as covering entities. The entity for which the activity is being performed is referred to herein as the covered entity. The schedules for the covering entities should be coordinated such that the required number of the covering entities is scheduled to perform the activity for the covered entity.

In one example, child care is an activity that requires at least one covering entity to watch the child at any particular period of time. In one scenario, a child's covering entities include parents and a babysitter. These covering entities must coordinate their schedules such that at least one of the covering entities is scheduled to watch the child. In one scenario, the child goes to school at 8 am and returns home at 3 pm. At least one person is needed to care for the child after school. The parents work from 9 am until 5 pm every day, and take turns driving the child to school in the morning. The child's babysitter is scheduled to pick the child up from school and watch him until at least one of the parents return home at 5 pm. In the above scenario, in order to ensure that care is provided by at least one person at all times, the parents and babysitter maintain calendars describing their schedules and coordinate with each other. The parents and babysitter may all use different types of electronic calendaring systems. In order to coordinate their respective schedules, the parents and babysitter leave notes on the refrigerator or leave voicemails for each other to set schedules. However, this system may result in miscommunications of schedules. It would be beneficial to have an electronic calendaring system that is operable to conveniently coordinate the schedules of the parents and babysitter. Further, it would be beneficial to have a calendaring system that is operable to integrate the different types of calendaring systems used by the parents and babysitter.

Calendaring systems are available for coordinating schedules. One problem associated with conventional calendar systems for coordinating schedules is that the calendar system that must be maintained separately from personal calendaring applications for each covering entity. The result is that two separate calendars must be maintained by each covering entity. The difficulty associated with maintaining multiple separate calendars increases the likelihood of an undesired gap in coverage.

Accordingly, in light of the above described difficulties and needs, there exists a need for improved methods, systems, and computer program products for calendar-based coverage monitoring.

SUMMARY

The subject matter described herein includes methods, systems, and computer program products for calendar-based coverage monitoring. According to one aspect, a method includes receiving a coverage rule defining at least one covering entity for performing an activity for a covered entity and at least one period of time during which the at least one covering entity is to perform the activity. Individual calendars for the at least one covering entity are monitored and a change in one of the calendars is detected. Further, it is determined whether the change causes the coverage rule to be violated, and in response to determining that the change causes the coverage rule to be violated, a notification indicating violation of the coverage rule is automatically generated.

According to another aspect, a system is described for calendar-based coverage monitoring. The system includes a rule receiver configured to receive a coverage rule defining at least one covering entity for performing an activity for a covered entity and at least one period of time during which the at least one covering entity is to perform the activity. The system further includes a rule monitor configured to monitor individual calendars for the at least one covering entity and detecting a change in one of the calendars. The rule monitor is further configured to determine whether the change causes the coverage rule to be violated, and in response to determining that the change causes the coverage rule to be violated, to automatically generate a notification indicating violation of the coverage rule.

BRIEF DESCRIPTION OF THE DRAWINGS

Embodiments of the subject matter described herein will now be explained with reference to the accompanying drawings of which.

DETAILED DESCRIPTION

The subject matter described herein includes methods, systems, and computer program products for calendar-based coverage monitoring. According to one aspect, a system according to the subject matter described herein may be implemented as hardware, software, and/or firmware components executing on one or more components of a system or device configured to provide calendar-based coverage monitoring.

As described above, the term "covered entity" refers to a person, object, or task requiring "coverage". Coverage can include any service, task, or activity performed by a covering entity. As used herein, the term "covering entity" refers to a person providing coverage to a covered entity.

For example, a secretary may be responsible for answering the phone and greeting visitors in an office. In order to perform this responsibility, the secretary must be physically present in the office. In another example, an information technology (IT) specialist may be responsible for responding to IT emergencies (i.e., be on-call), and is not required to be physically present in the office. Thus, in these examples, both the secretary and the IT specialist may be termed "covering entities" that provide in-office coverage and on-call coverage, respectively, to a covered entity.

As used herein, the term "polling" refers to actively monitoring changes to information. For purposes of this description, polling may include querying a database for updated information based on a predetermined schedule or event. For example, a polling entity may query a database every five minutes and receive a response indicating whether updated information is available.

As used herein, the term "subscribing" refers to passively monitoring changes to information. For purposes of this description, subscribing may include awaiting notification of changes to a given set of information. For example, a subscribing entity may automatically receive a notification from an information database indicating that updated information is available. A subscription is obtained by communicating a subscription request to the information provider.

The subject matter described herein may be implemented using a computer-readable medium containing a computer program, executable by a machine, such as a computer. Exemplary computer readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple devices or computing platforms.

As used herein, a "computer-readable medium" can be any means that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, or device.

More specific examples (a non-exhaustive list) of the computer-readable medium can include the following: a portable computer diskette, a random access memory (RAM), a read only memory (ROM), an erasable programmable read only memory (EPROM or Flash memory), an optical fiber, a portable compact disk (CD), a portable digital versatile disk (DVD), and the like.

Figure 1:
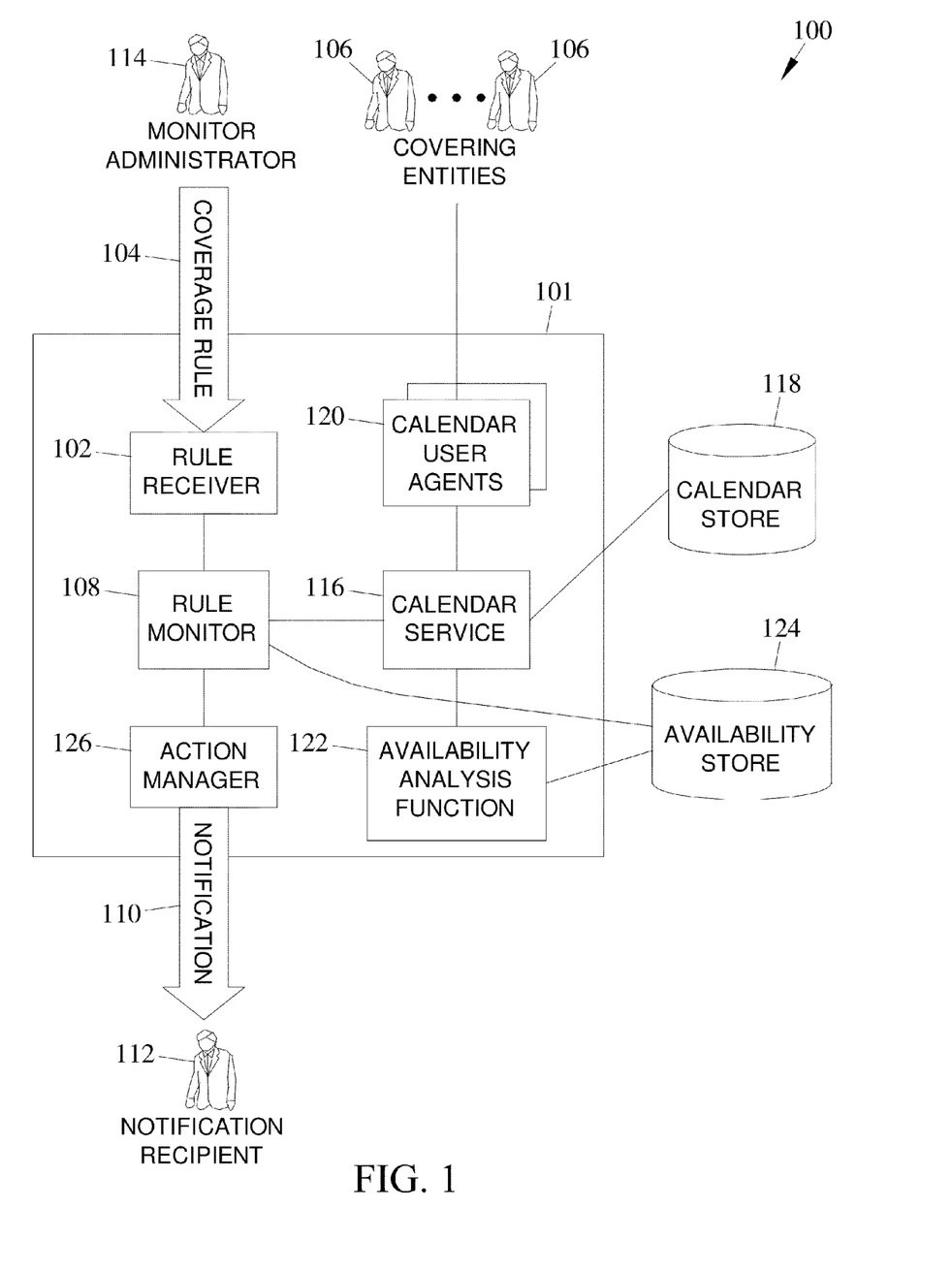
FIG. 1 is a block diagram of an exemplary calendar-based coverage monitoring system according to an embodiment of the subject matter described herein.

FIG. 1 is a block diagram of an exemplary calendar-based coverage monitoring system 100 according to an embodiment of the subject matter described herein. Referring to FIG. 1, calendar-based coverage monitoring system 100 includes a server 101 that includes a rule receiver 102 for receiving a coverage rule 104 defining multiple covering entities 106 for performing an activity for a covered entity and at least one period of time during which the multiple covering entities 106 are to perform the activity. System 100 further includes a rule monitor 108 for monitoring individual calendars for the multiple covering entities 106 and detecting changes in one or more of the calendars. Rule monitor 108 is configured to determine whether a change in one of the calendars causes coverage rule 104 to be violated, and if so, to generate a notification 110 indicating a violation of coverage rule 104. Notification 110 may be communicated to a notification recipient 112.

In one embodiment, coverage rule 104 is communicated to rule receiver 102 by monitor administrator 114. A change in a calendar is detected by calendar service 116, which monitors calendar information stored in calendar store (or database) 118. Changes to calendar information are made by one or more covering entities 106 by interfacing with calendar service 116 via one or more calendar user agents 120. For example, administrator 114 may input coverage rule 104 into server 101 via a user interface. Additionally, availability analysis function 122 determines that a change to the calendar information was made and generates updated availability information. Availability information is stored in availability store (or database) 124, and monitored by rule monitor 108.

Upon detecting a change to calendar information, rule monitor 108 determines whether the change causes a coverage rule to be violated. If rule monitor 108 determines that the change to calendar information causes coverage rule 104 to be violated, rule monitor 108 generates a notification 110 for a notification recipient 112. Rule monitor 108 may communicate with action manager 126 and instruct it to transmit or otherwise perform an action with notification 110. For example, in addition to transmitting notification 110, action manager 126 may add a calendar event for one or more covering entities 106 indicating a change in the availability of another covering entity. Notification 110 may be communicated via an email, text message such as a short messaging service (SMS) message or an instant message, a multimedia messaging service (MMS) message, voice mail, a popup window, a page, a change to the calendar information associated with another covering entity, or other means of communication.

Figure 2:
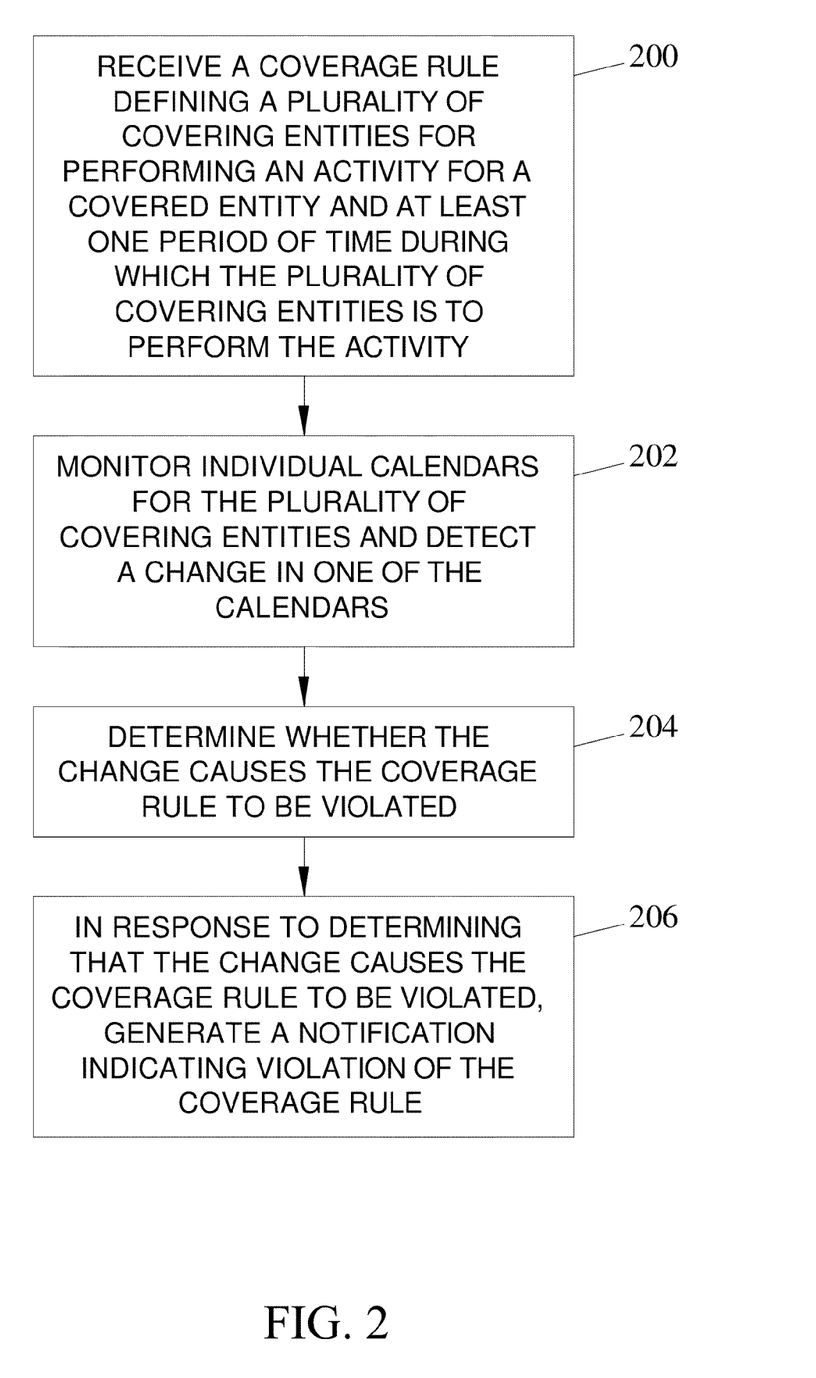
FIG. 2 is a flow chart of an exemplary process for calendar-based coverage monitoring according to an embodiment of the subject matter described herein.

FIG. 2 is a flow chart of an exemplary process for providing calendar-based coverage monitoring according to an embodiment of the subject matter described herein. The process of FIG. 2 may be performed in this example with reference to system 100 of FIG. 1. Referring to FIG. 2, in block 200, a coverage rule defining multiple covering entities for performing an activity for a covered entity and at least one period of time during which the multiple covering entities are to perform the activity is received. Accordingly, calendar-based coverage monitoring system 100 includes means for receiving a coverage rule defining multiple covering entities for performing an activity for a covered entity and at least one period of time during which the multiple covering entities is to perform the activity. For example, rule receiver 102 receives coverage rule 104, which defines covering entities 106 for performing an activity for a covered entity and at least one period of time which covering entities 106 are to perform the activity. Coverage rule 104 may be provided to rule receiver 102 by monitor administrator 114 using a user interface or by an application program (not depicted) using an application program interface (API).

Coverage rule 104 includes parameters used by rule monitor 108 in determining whether a change to monitored calendar information causes coverage rule 104 to be violated. In one example, coverage rule 104 can include covering entity IDs identifying the covering entities 106. For example, the covering entity IDs may be a list of names or a group name for the covering entities. In one example, covering entity IDs may include the first names of each covering entity in a group, such as "Bob", "Paul", "Stephen", and "Ted", or may include the name of a group, such as "Deep Thought Inc."

In another example, coverage rule 104 can include an activity ID identifying the covered activity. Identification of a covered activity may include a description of coverage provided by a covering entity. For example, activity IDs may include in-office phone coverage, on-call coverage, home child care coverage, and elder care coverage. It will be appreciated that different activity IDs may place different constraints on a covering entity. For example, in-office phone coverage may require a covering entity to be physically present in an office in order to provide coverage, but may not otherwise restrict their activity. Alternatively, on-call coverage may place fewer constraints on the covering entity.

In another example, coverage rule 104 can include time periods indicating the time periods during which coverage is required. For example, in-office phone coverage may be required between 8 am-5 pm, Monday-Friday. Thus, in this example, the time period information included in coverage rule 104 includes Monday: 8 am-5 pm, Tuesday: 8 am-5 pm Wednesday: 8 am-5 pm, Thursday: 8 am-5 pm, and Friday: 8 am-5 pm.

In another example, coverage rule 104 can include the required number of covering entities associated with an activity ID. This number may indicate a minimum or maximum number of covering entities, and will be discussed in greater detail with reference to the comparison rule below. For example, in-office phone coverage may require coverage by at least one covering entity. Alternatively, on-call coverage may limit coverage to no more than four covering entities.

In another example, coverage rule 104 can include a comparison rule specifying a mathematical relationship between the number of actual covering entities and the number of required covering entities. This mathematical relationship may include one of greater than, greater than or equal to, equal to, less than or equal to, or less than. For example, in-office phone coverage may require that the number of people answering the phone be greater than or equal to one. In another example, on-call coverage may require that the number of IT specialists providing on-call coverage be less than or equal to four and greater than zero as well.

For each of the above described parameters of coverage rule 104, defaults may be provided or specified by a monitor administrator 114. For example, coverage rule 104 may define the default number of covering entities equal one, the default time period equal to 8 am-5 pm, Monday-Friday, and the comparison rule to "greater than or equal to".

Figure 3A:
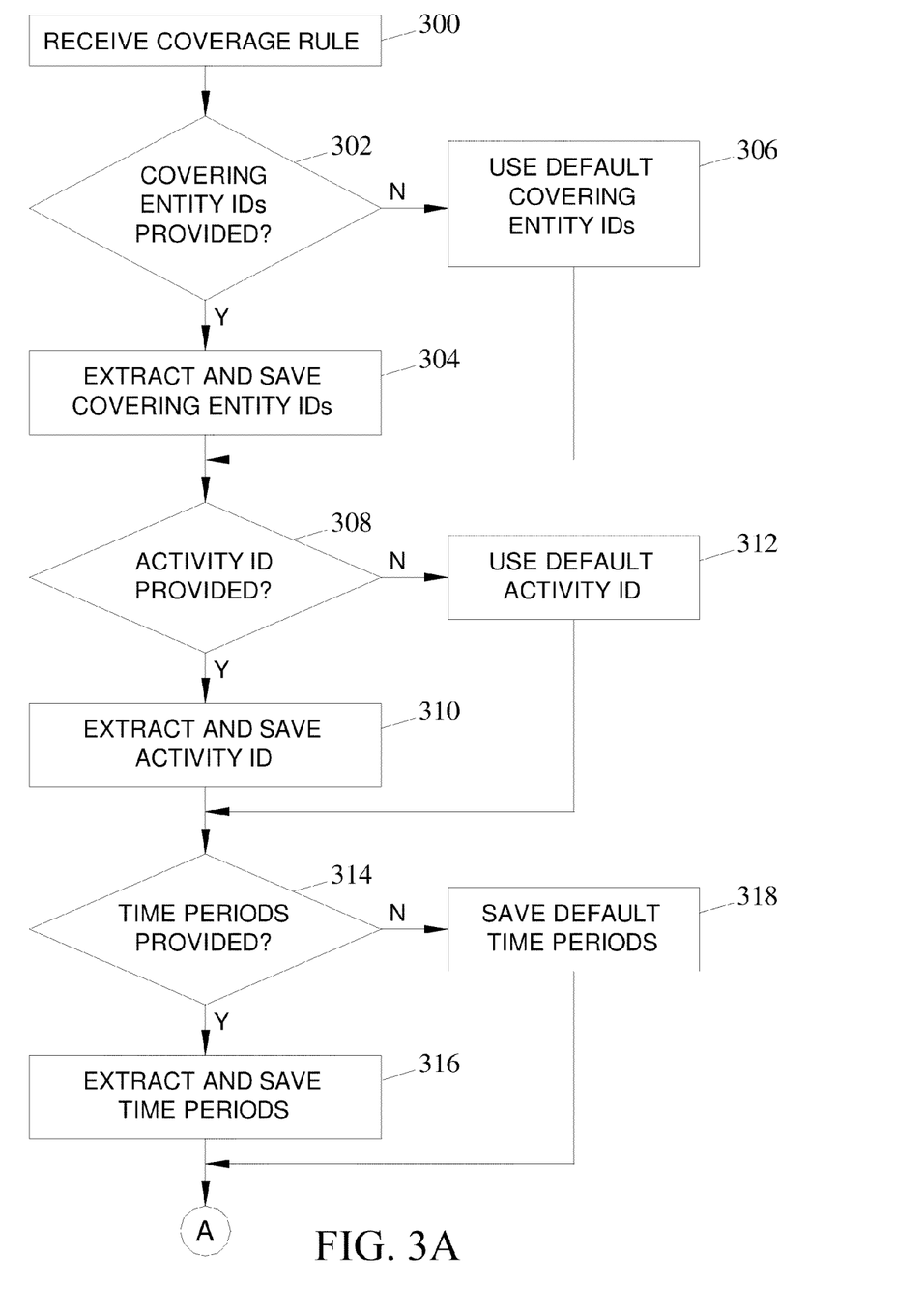
FIGS. 3A and 3B are a flow chart of an exemplary process for extracting and saving information from a received coverage rule according to an embodiment of the subject matter described herein.
Figure 3B:
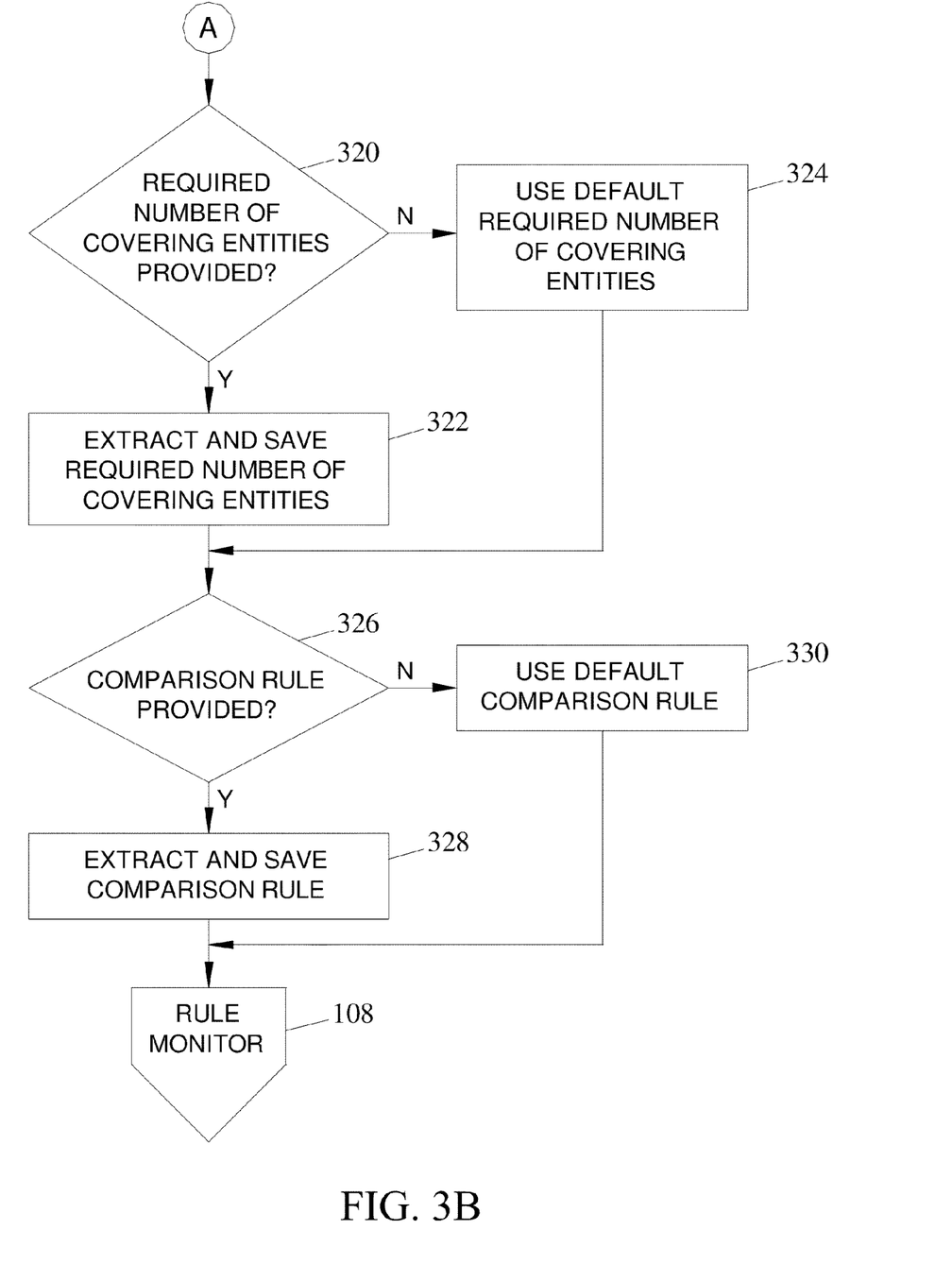

An exemplary process for receiving a coverage rule including the parameters described above defining multiple covering entities for performing an activity for a covered entity and at least one period of time during which the number of covering entities is to perform the activity is illustrated in FIGS. 3A and 3B. More particularly, FIGS. 3A and 3B are a flow chart illustrating in greater detail an exemplary process for performing the steps in block 200 of FIG. 2 according to an embodiment of the subject matter described herein. Referring to FIG. 3A, in block 300, a coverage rule is received. For example, rule receiver 102 may receive the any one of the following exemplary coverage rules and parameters.

Phone coverage rule for the week of Dec. 3, 2006:
Covering entity IDs: {Bob, Paul, Ted, Steve}
Activity Id: phone
Time periods: {12/4/2006, 8:00-17:00; 12/5/2006, 8:00-17:00; 12/6/2006, 8:00-17:00; 12/7/2006, 8:00-17:00; 12/8/2006, 8:00-17:00}
Required number of covering entities: 1
Comparison rule: greater than or equal to.
On-call coverage rule for the week of Dec. 3, 2006:
Covering entity IDs: {Bob, Paul, Ted}
Activity Id: on-call
Time periods: {12/3/2006, 00:00-24:00; 12/4/2006, 00:00-8:00; 12/4/2006, 17:00-24:00; 12/5/2006, 00:00-8:00; 12/5/2006, 17:00-24:00; 12/5/2006, 00:00-8:00; 12/5/2006, 17:00-24:00; 12/7/2006, 00:00-8:00; 12/7/2006, 17:00-24:00; 12/8/2006, 00:00-8:00; 12/8/2006, 17:00-24:00; 12/9/2006, 00:00-24:00;}
Required number of covering entities: 1
Comparison rule: greater than or equal to.

In block 302, a determination is made as to whether covering entity IDs are provided in the received coverage rule. If covering entity IDs are provided, then the covering entity IDs are extracted and saved in block 304. If no covering entity IDs are provided, then default covering entity IDs are saved in block 306. For example, for the phone coverage rule illustrated above, covering entity IDs {Bob, Paul, Ted, Steve} are provided and are therefore extracted and saved according to block 304. For the on-call coverage rule illustrated above, covering entity IDs {Bob, Paul, Ted} are provided and therefore are extracted and saved according to block 304.

In block 308, a determination is made whether an activity ID is provided in the received coverage rule. If an activity ID is provided, then the activity ID is extracted and saved in block 310. Continuing the example illustrated above, an activity ID "phone" is provided for phone coverage rule and an activity ID "on-call" is provided for the on-call coverage rule. Accordingly, the activity IDs "phone" and "on-call" are extracted and saved in block 310. If no activity ID is provided, then a default activity ID may be saved in block 312.

In block 314, a determination is made as to whether time periods are provided in the received coverage rule. If time periods are provided, then the time periods are extracted and saved in block 316. Continuing the example illustrated above, time periods {12/4/2006, 8:00-17:00; 12/5/2006, 8:00-17:00; 12/6/2006, 8:00-17:00; 12/7/2006, 8:00-17:00; 12/8/2006, 8:00-17:00} are provided for phone coverage rule and time periods {12/3/2006, 00:00-24:00; 12/4/2006, 00:00-8:00; 12/4/2006, 17:00-24:00; 12/5/2006, 00:00-8:00; 12/5/2006, 17:00-24:00; 12/5/2006, 00:00-8:00; 12/5/2006, 17:00-24:00; 12/7/2006, 00:00-8:00; 12/7/2006, 17:00-24:00; 12/8/2006, 00:00-8:00; 12/8/2006, 17:00-24:00; 12/9/2006, 00:00-24:00;} are provided for the on-call coverage rule. Accordingly, the activity IDs {12/4/2006, 8:00-17:00; 12/5/2006, 8:00-17:00; 12/6/2006, 8:00-17:00; 12/7/2006, 8:00-17:00; 12/8/2006, 8:00-17:00} and {12/3/2006, 00:00-24:00; 12/4/2006, 00:00-8:00; 12/4/2006, 17:00-24:00; 12/5/2006, 00:00-8:00; 12/5/2006, 17:00-24:00; 12/5/2006, 00:00-8:00; 12/5/2006, 17:00-24:00; 12/7/2006, 00:00-8:00; 12/7/2006, 17:00-24:00; 12/8/2006, 00:00-8:00; 12/8/2006, 17:00-24:00; 12/9/2006, 00:00-24:00;} may be extracted and saved in block 310. If no time periods are provided, then default time periods are saved in block 318.

Referring to FIG. 3B, in block 320, a determination is made as to whether the required number of covering entities is provided in the received coverage rule. If the required number of covering entities is provided, then the required number of covering entities is extracted and saved in block 322. Continuing the example illustrated above, the required number of covering entities equal to "1" is provided both for the phone coverage rule and for the on-call coverage rule. Accordingly, the number "1" is extracted and saved in block 322. If the required number of covering entities is not provided, then a default number of covering entities may be saved in block 324.

In block 326, a determination is made as to whether a comparison rule is provided in the received coverage rule. If a comparison rule is provided, then the comparison rule may be extracted and saved in block 326. Continuing the example illustrated above, a comparison rule "greater than or equal to" is provided for the phone coverage rule and for the on-call coverage rule. Accordingly, the comparison rules "greater than or equal to" are extracted and saved in block 326. If no comparison rule is provided, then a default comparison rule may be saved in block 330. Upon completing the steps described in blocks 300-330 above, saved information associated with the received coverage rule may be forwarded to rule monitor 108.

Returning to FIG. 2, in block 202, individual calendars for multiple covering entities are monitored and a change in one of the calendars is detected. Accordingly, system 100 includes means for monitoring individual calendars for multiple covering entities and detecting a change in one of the calendars. For example, rule monitor 108 monitors individual calendars for multiple covering entities for detecting a change in one of the calendars. The rule monitor 108 can interact with other components to perform the functionality associated with block 202, which is described in greater detail below. In addition, rule monitor 108 can interact with other components to perform the functionality associated with blocks 204 and 206, which is also described in greater detail below.

For each covering entity 106, associated calendar information describing various activities and time periods to be performed by covering entity 106 may be stored. For example, calendar information may be stored in calendar store 118 and used by calendar service 116 for providing each covering entity 106 a method for viewing and retrieving his or her schedule. For example, covering entity 106 may have a meeting scheduled from 11:30 am-3 pm on Thursday, Nov. 30, 2006. The date, time and activity data associated with this meeting constitutes calendar information stored in calendar store 118 and accessed by calendar service 116.

The calendar information stored in calendar store 118 is monitored by availability analysis function 122. In one example, availability analysis function 122 may subscribe to updates to calendar store 118. For example, when calendar information stored in calendar store 118 is updated, an update notification may be sent to availability analysis function 122, which retrieves the updated data from calendar store 118 in response to the notification.

Based on calendar information stored in calendar store 118, availability information associated with covering entity 106 is generated and stored in availability store 124. Availability information is generated by availability analysis function 122 and includes transition periods and availability status for an associated covering entity. For example, availability analysis function 122 may locate all calendar entry events for a covering entity 106 that lie within or partially within the time period under consideration. Availability analysis function 122 may then determine one or more transition points (i.e., start and stop times) for the located calendar entry events and generate a list of transition points associated with covering entity's 106 availability. The list of potential transition points breaks the time period under consideration into a sequence of shorter time periods. For each of these shorter time periods, availability analysis function 122 determines whether covering entity 106 is available or unavailable to provide coverage based on a calendar entry event. Availability analysis function 122 may perform this analysis separately for each type of availability. For example, on-call availability may be computed and stored separately from phone availability.

Figure 5:
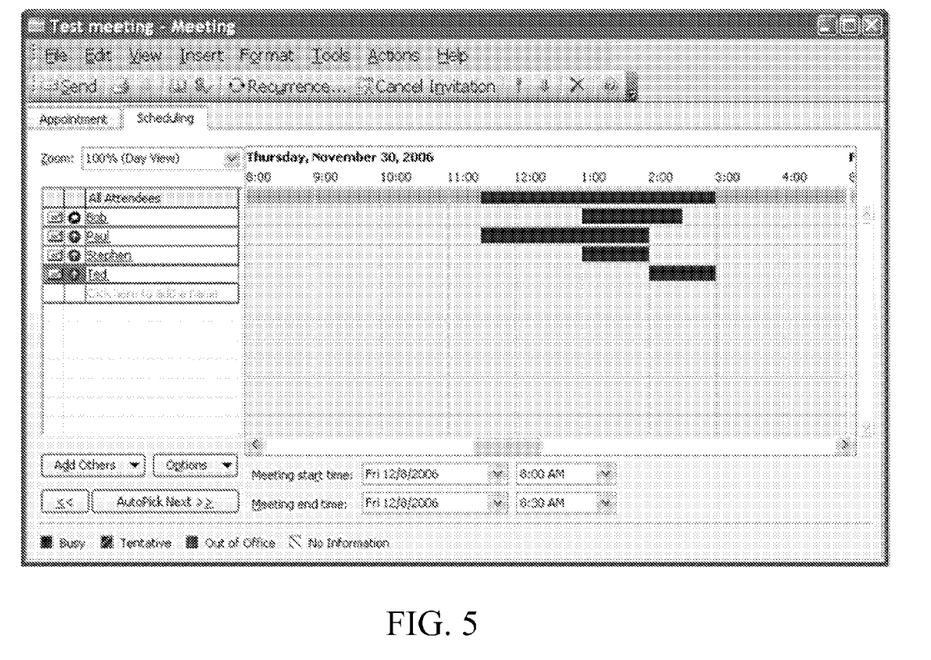
FIG. 5 is an exemplary screen display of an electronic calendar including availability data associated with multiple covering entities according to an embodiment of the subject matter described herein.

FIG. 5 is an exemplary screen display illustrating availability data according to an embodiment of the subject matter described herein. Referring to FIG. 5, covering entities "Bob," "Paul," "Stephen," and "Ted" each have meeting calendar events scheduled for Thursday, Nov. 30, 2006. In this exemplary scenario, for time periods during which a covering entity is in a meeting, they are unavailable to provide coverage and are therefore "busy". Alternatively, for time periods during which a covering entity is not in a meeting, they are available to provide coverage and are therefore "free".

Bob is scheduled to be in meetings from 1 pm-2:30 pm, Paul is scheduled to be in meetings from 11:30 am-2:00 pm, Stephen is scheduled to be in a meeting from 1 pm-2:00 pm, and Ted is scheduled to be in a meeting from 2 pm-3:00 pm.

First, availability analysis function 122 determines availability transition points {13:00, 14:30} associated with Bob, {11:30, 14:00} associated with Paul, {13:00, 14:00} associated with Stephen, and {14:00, 15:00} associated with Ted. The generated availability information described above may be stored in availability store 124. It is appreciated that a single busy period such as the {11:30, 14:00} period associated with Paul shown in FIG. 5 may result from more than one calendar event. These events may be consecutive and/or overlapping. Thus, the availability analysis performed by availability analysis function 122 can include an analysis of transition points associated with more than one calendar event per covering entity 106 which are merged into a single availability status, such as "busy," for a period of time representing multiple calendar events. Upon change of this availability information, for example, after the time Ted's meeting was placed on his calendar, rule monitor 108 is informed by calendar service 116 of the change in calendar data. Rule monitor 108 accesses availability store 124 to retrieve and analyze the changed availability information.

Rule monitor 108 then performs an availability analysis for each period of time included in the set of availability transition points for covering entities Bob, Paul, Stephen, and Ted, which is {11:30, 13:00, 14:00, 14:30, 15:00}. For each time period, rule monitor 108 determines the number of covering entities available to provide coverage. For the time period 11:30-13:00, Paul is busy, and Bob, Stephen and Ted are free, and so three of the covering entities are available for coverage during this time period. For the time period 13:00-14:00, Bob, Paul, and Stephen are busy, and Ted is free, so only one coverage entity is available. For the time period 14:00-14:30, Bob and Ted are busy, and Paul and Stephen are free, and so two coverage entities are available. Finally, for the time period 14:30-15:00, Ted is busy, and Bob, Paul and Stephen are free, and the number of available covering entities is again three.

Similar to the monitoring of calendar information stored in calendar store 118 described above, availability information stored in availability store 124 is monitored for updates. In one example, rule monitor 108 subscribes to updates to availability store 124. For example, when availability information stored in availability store 124 is updated by availability analysis function 122, an update notification is sent by availability analysis function 122 to calendar service 116, which notifies rule monitor 108 of the update. Rule monitor 108 then retrieves the updated data from availability store 118 and performs the analysis described earlier.

Figure 4:
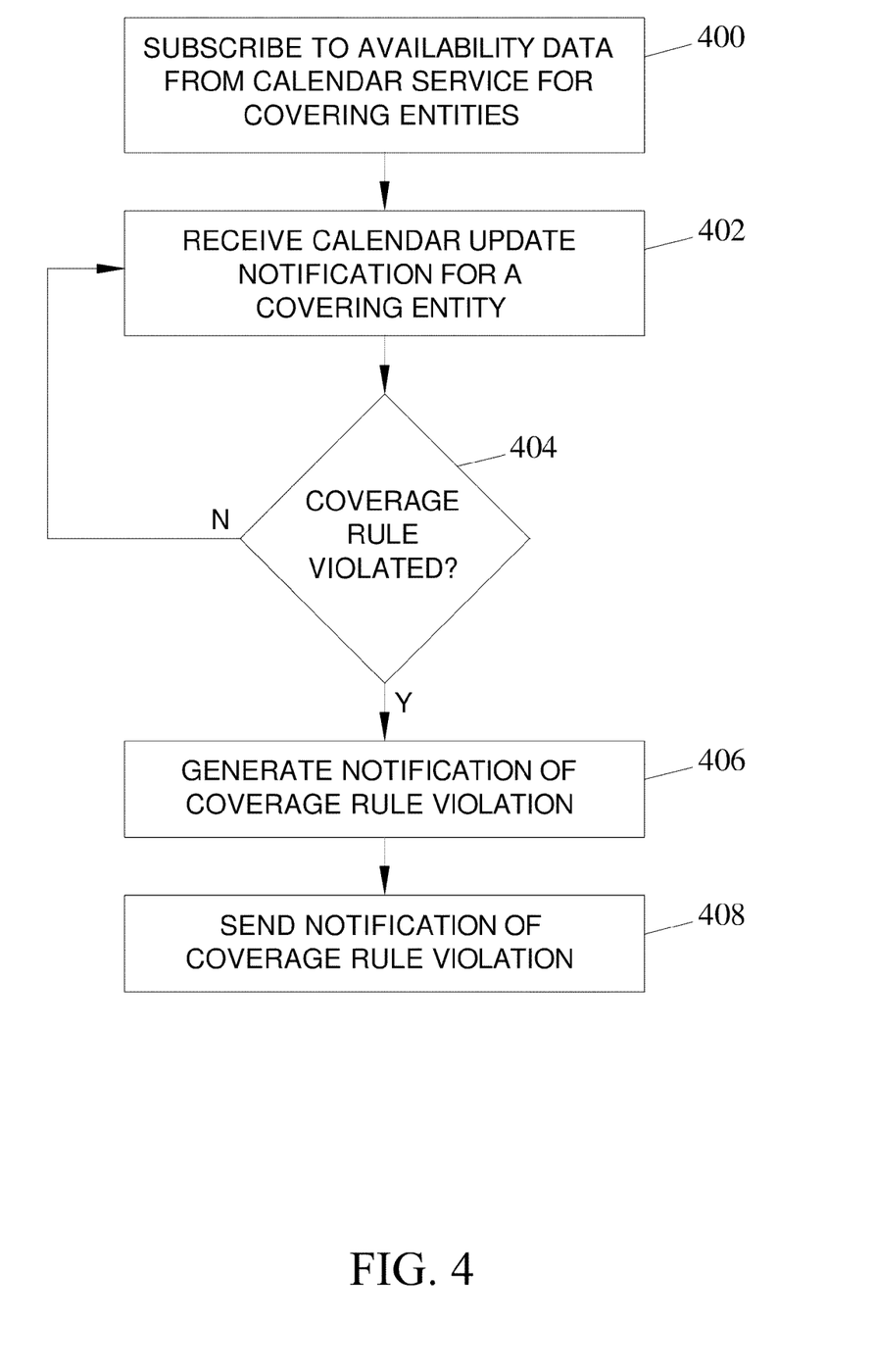
FIG. 4 is a flow chart of an exemplary process for monitoring a calendar for a change, determining whether the change violates a coverage rule, and generating a notification of a coverage rule violation according to an embodiment of the subject matter described herein.

FIG. 4 is a flow chart illustrating an exemplary process for subscribing to availability information, for receiving a calendar update notification, for determining whether a coverage rule was violated, and for generating and sending a notification of a coverage rule violation according to an embodiment of the subject matter described herein.

Referring to FIG. 4, blocks 400 and 402 are exemplary detailed steps for monitoring individual calendars for multiple covering entities and detecting a change in one of the calendars. Rule monitor 108 subscribes to availability information from calendar service 116 for covering entities 106. Thus, when calendar information associated with a covering entity 106 is updated, calendar service 116 informs availability analysis function 122, which recomputes the availability information for that entity. Availability analysis function 106 then informs calendar service 116 that availability information has been updated, and calendar service 116 then notifies rule monitor 108.

In block 402 of FIG. 4, a calendar update notification for a covering entity is received. This would have resulted from a change to calendar information made via one or more calendar user agents 120. Rule monitor 108 may receive the calendar update notification.

Figure 6:
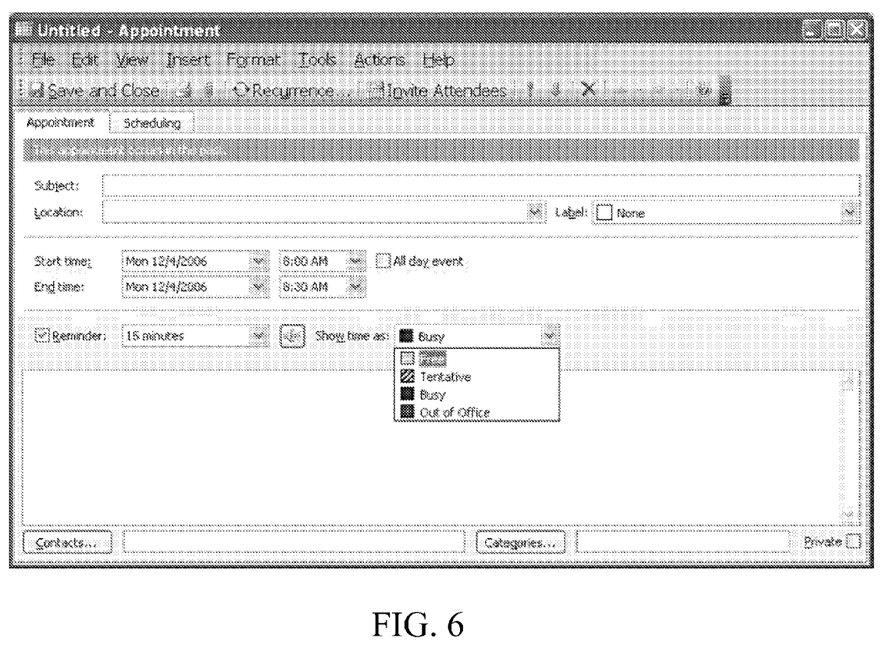
FIG. 6 is an exemplary screen display of a user interface for entering a calendar event in an electronic calendar according to an embodiment of the subject matter described herein.

FIG. 6 is a screen display of an exemplary interface for updating calendar information associated with a covering entity. Referring to FIG. 6, entry boxes and/or drop down menus are displayed for entering a subject, location, start time, and end time for the calendar entry event. The screen display also provides an interface for selecting availability information associated with the calendar event in addition to "free" and "busy". For example, the drop-down menu provided includes availability selections including "tentative" and "out of office". An extension or modification to this drop-down list or another similar drop-down list can be used to indicate whether or not this event makes the person unavailable for covering a particular activity.

Calendar event types may include "appointment" and "meeting request". Finer-grained event types such as "vacation", "out-of-town business trip", "personal", and "working from home" may also be included. Certain event types may have default coverage attributes. For example, "vacation", "out-of-town business trip", and "working from home" events may indicate that the covering entity is unavailable for phone coverage by default. Other event types may have configurable coverage attributes. For example, "personal" events could have a pull down menu or a checkbox allowing a covering entity to indicate their availability for different types of coverage.

Calendar information and availability information may be independently entered by covering entity 106. For example, covering entity 106 utilizes a user interface for entering calendar and availability information, such as that shown in FIG. 6, to enter a personal calendar event "study for exam". By default, availability analysis function 122 determines that covering entity 106 is busy, and therefore unavailable to provide coverage, during this calendar event. However, covering entity may then specify their availability status as free to provide coverage, in spite of the entered calendar event. In addition to specifying coverage availability using default or explicit parameters on events such as meetings, covering entity 106 may enter their coverage availability for a given time period by entering a coverage-specific calendar event that represents coverage availability but does not represent a user activity such as a meeting or a vacation period. Thus, information may be placed on a calendar just to represent coverage needs or coverage availability. User views could be provided that showed all events, only the non-coverage events, or only the coverage events. Because one calendar event may have multiple coverage implications, the event may be included in multiple user views.

The functionality of the user interface illustrated in FIG. 6 for updating calendar information maintained by calendar service 116 may be provided by one or more calendar user agents 120. Calendar user agents 120 may be co-located with calendar service 116, as illustrated in FIG. 1 or may be remote from calendar service 116.

In an exemplary scenario illustrating monitoring individual calendars for multiple covering entities and detecting a change in one of the calendars, rule monitor 108 monitors calendar information stored in calendar store 118 by subscribing to calendar service 116. When a change is made to calendar store 118, a notification of the change is sent by calendar service 116 to rule monitor 108. For example, Bob adds a new event labeled "vacation" to his calendar via a calendar user agent 120. The calendar event is saved to calendar store 118 by calendar service 116. Calendar service 116 then notifies availability analysis function 122 of the change, which generates updated on-call and phone coverage availability information for Bob. The updated availability information is stored in availability store 124, and a notification is sent to rule monitor 108 via calendar server 116 that availability store 124 contains updated availability information. In this example, a vacation event indicates that Bob is unavailable for both on-call and phone availability.

Calendar information sent from calendar service 116 may be sent in a variety of formats including, for example, iCalendar format, which defines a standard for calendar data exchange in RFC 2445. iCalendar data has a multipurpose Internet mail extension (MIME) content type "text/calendar" which specifies a format for non-ASCII messages that can be sent over the Internet. iCalendar data files are American standard code for information interchange (ASCII) plain text files with a file extension ".ics" and are terminated at each line by "CRLF" (i.e., a hex value of 0DOA). Additionally, the iCalendar format defines a file extension ".ifb" for storing availability information, such as free/busy. Many popular calendar programs support the iCalendar standard, including the MICROSOFT OUTLOOK® calendar program (available from Microsoft Corp., of Redmond, Wash.) and the IBM LOTUS NOTES® calendar program (available from IBM Corp., of Armonk, N.Y.).

Returning to FIG. 2, in block 204, a determination is made whether the change causes the coverage rule to be violated. Accordingly, system 100 includes means for determining whether a change in a calendar causes a coverage rule to be violated. For example, rule monitor 108 is configured to determine whether a change in calendar information stored in calendar store 118 or availability information stored in availability store 124 causes coverage rule 104 to be violated.

In one example of determining whether a change to a calendar causes a coverage rule to be violated, a period of time associated with the coverage rule is examined. Referring again to an example described above in block 202, a time period was divided into several smaller time periods based on the transition periods associated with the availability data for Bob, Paul, Stephen, and Ted generated by availability analysis function 122. For each time period, rule monitor 108 determines the number of covering entities available for coverage within that time period. In the example, the first time period examined by rule monitor 108 is 8:00-11:30. The number of covering entities available during this time period is 4. Rule monitor 108 may compare the covering entities available with the number of covering entities using the comparison rule. For both the phone coverage rule and the on-call coverage rule described above, the number of covering entities is "1" and the comparison rule is "greater than or equal to". Rule monitor 108 determines that 4>=1 and therefore no coverage rule violation occurs for the time period 8:00-11:30. This determination is made for each time period provided by availability analysis function 122. As illustrated in FIG. 5, for all time periods between 8:00-17:00, at least one covering entity is available and therefore no coverage rule violation occurs.

In another example, Ted adds a calendar event from 1 pm-2 pm that either implicitly or explicitly indicates that Ted is not available to provide phone coverage during that time. Rule monitor 108 may then be notified of Ted's change in availability and a determination is made whether the change causes a coverage rule to be violated. Rule monitor 108 determines that between 13:00-14:00, the number of covering entities is 0. Because 0 is not greater than or equal to 1, rule monitor 108 determines that from 1 pm-2 pm Ted's change would cause the phone coverage rule to be violated.

Returning to FIG. 2, in block 206, in response to determining that the change causes the coverage rule to be violated, a notification indicating violation of the coverage rule is generated. The steps described in block 206 of FIG. 2 are related to those described in blocks 406 and 408 of FIG. 4 and are performed by the rule monitor 108. Accordingly, system 100 includes means for generating a notification indicating violation of the coverage rule in response to a determination that a change to a calendar causes a coverage rule to be violated. Rule monitor 108 is configured to instruct action manager 126 to forward notification 110 generated under the control of rule monitor 108 indicating violation of the coverage rule in response to a determination that a change to a calendar causes a coverage rule to be violated. For example, rule monitor 108 may determine that the phone coverage rule is violated between 1 pm-2 pm by Ted's change and generate, or cause to be generated, notification 110. Action manager 126 may send notification 110 to one or more notification recipients 112.

In order to send notification 110 to one or more notification recipients 112, action manager 126 is configured to determine the destination and notification techniques associated with notification recipients 112. Notification methods may include email, text messaging service such as short messaging service (SMS) or Instant Messaging, multimedia messaging service (MMS), voice mail delivery, popup window, page, a change to a calendar of a covering entity or any other notification technique.

The format and content of notification 112 may vary based upon the notification technique employed. For example, an email notification may contain detailed availability information for all covering entities, including an indication of which covering entity's calendar change triggered the violation, and a list of time periods for when the violation would occur. An SMS message, on the other hand, may contain a much shorter statement of the violation.

In one example, an email notification is sent to Bob, Paul, Stephen, and Ted indicating that Ted's unavailability between 1 pm-2 pm has caused a violation of phone coverage rule 104. Paul could decide that his event could be cancelled or rescheduled and he could then inform the others that he can cover that time period.

In one embodiment, rule monitor 108 may detect when availability information associated with covering entities 106 would cause the number of available covering entities to have a predetermined relationship with respect to the number of covering entities required by the coverage rule and instruct action manager 126 to generate a warning notification 110 indicating that a potential for violating coverage rule 104 exists. For example, coverage rule 104 specifies that the number of covering entities must be greater than or equal to one, but that a warning notification 110 should be generated if the number of covering entities 106 is less than four. Initially, ten covering entities are available to provide coverage during the time period. Subsequently, six covering entities become unavailable during the time period (e.g., illness, vacation, business travel, etc.), and update their calendar and availability information accordingly. Finally, a seventh covering entity becomes unavailable. Rule monitor 104 determines that the threshold criteria for generating a coverage warning has been met, and notifies one or more notification recipients 112. In this example, rather than taking action only when the last person became unavailable, as indicated by his/her new or changed calendar entry, rule monitor 108 would take action earlier.

In one embodiment, rule monitor 108 may be configured to automatically add a calendar event entry associated with one or more covering entities 106 in response to determining that the change would cause the number of available covering entities to have a predetermined relationship with respect to the number of covering entities required by the coverage rule. For example, in the event that Bob and Paul are available to provide coverage during a time period and a Bob updates his calendar to indicate that he will be unavailable, rule monitor 108 may automatically add a calendar event to Paul's calendar indicating that Paul is the sole covering entity during that time period. Thus, when Paul checks his calendar, he will be notified that Bob has made him responsible for providing coverage during that time period. The automatic addition of a calendar event entry to one or more covering entities may be viewed as a specific implementation of the steps described in block 206 of FIG. 2 and blocks 406 and 408 in FIG. 4.

Figure 7:
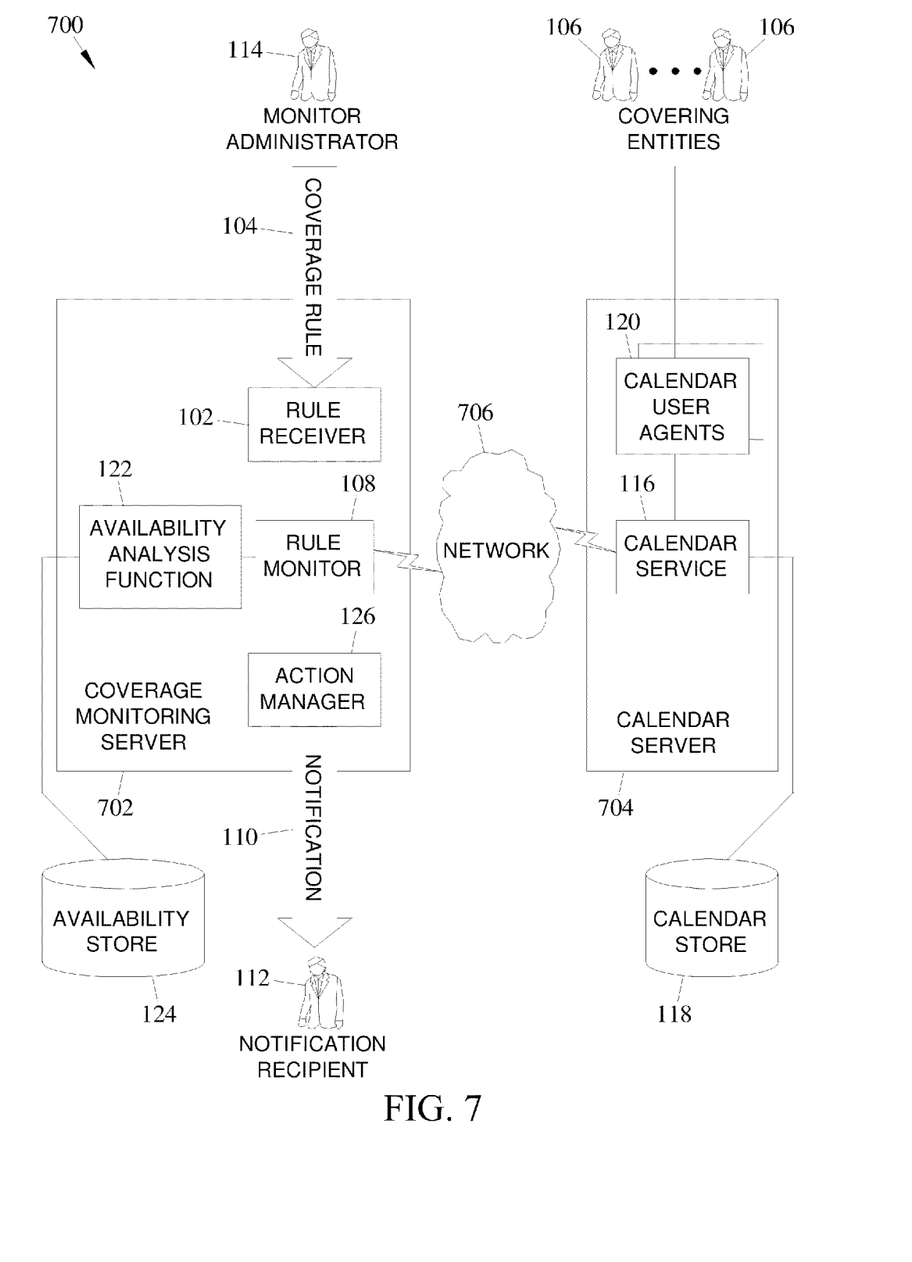
FIG. 7 is a block diagram of an exemplary calendar-based coverage monitoring system according to an embodiment of the subject matter described herein.

In one embodiment, calendar service 116 and rule monitor 108 are located remotely from each other and communicate via network 706. FIG. 7 is a block diagram of an exemplary calendar-based coverage monitoring system where the calendar service 116 and the rule monitor 108 are located remotely from each other and communicate via a network 706 according to an embodiment of the subject matter described herein. Referring to FIG. 7, calendar-based coverage monitoring system 700 includes coverage monitoring server 702 and calendar server 704. Calendar server 704 includes calendar service 116 and one or more calendar user agents 120 for managing calendar information associated with covering entities 106. Calendar information is stored in calendar store 118 connected to calendar service 116. Calendar service 116 is also connected to rule monitor 108 located on coverage monitoring server 702 via network 706.

Coverage monitoring server 702 includes rule receiver 102 configured to receive coverage rule 104 from monitor administrator 114. Rule monitor 108 communicates with rule receiver 102 in order to determine whether a change to a calendar causes coverage rule 104 to be violated. Coverage monitoring server 702 also includes availability analysis function 122 configured to generate availability information based on the calendar information stored in calendar store 118. Availability information generated by availability analysis function 122 is stored in availability store 124. Rule monitor 108 communicates with availability analysis function 122 in order to determine whether a change to a calendar causes coverage rule 104 to be violated. Upon determining that the change has caused coverage rule 104 to be violated, rule monitor 108 is configured to generate a notification indicating violation of the coverage rule and to instruct action manager 126 to send notification 110 indicating the violation to one or more notification recipients 112.

The executable instructions of a computer program for carrying out the methods illustrated in FIGS. 2, 3A, 3B, and 4 can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for calendar-based coverage monitoring, the method comprising:
   receiving a coverage rule defining at least one covering entity for performing an activity for a covered entity and at least one period of time during which the at least one covering entity is to perform the activity;
   monitoring individual calendars for the at least one covering entity and detecting a change in at least one of the calendars;
   determining whether the change causes the coverage rule to be violated; and
   in response to determining that the change causes the coverage rule to be violated, automatically generating a notification indicating violation of the coverage rule,
   wherein at least one of the preceding actions is performed on at least one electronic hardware component.

2. The method of claim 1 wherein receiving a coverage rule includes receiving a coverage rule including one of identification of each of the at least one covering entity, identification of a set including the at least one covering entity, identification of the covered entity, identification of the activity, and information associated with a required number of covering entities for performing the activity for the covered entity.

3. The method of claim 1 wherein receiving a coverage rule includes receiving a coverage rule defining a minimum number of covering entities for performing the activity during at least one period of time.

4. The method of claim 1 wherein monitoring individual calendars for the at least one covering entity comprise monitoring individual calendars for each of the at least one covering entity.

5. The method of claim 1 wherein monitoring individual calendars includes polling for information associated with the individual calendars.

6. The method of claim 1 wherein monitoring individual calendars includes subscribing to information associated with the individual calendars.

7. The method of claim 1 wherein monitoring individual calendars includes receiving one of an availability period of time and a non-availability period of time associated with the at least one covering entity, and wherein detecting a change in one of the calendars includes detecting a change to the one of the availability period of time and the non-availability period of time associated with the at least one covering entity.

8. The method of claim 1 wherein monitoring individual calendars includes monitoring individual calendars until the activity is performed.

9. The method of claim 1 wherein determining whether the change causes the coverage rule to be violated includes comparing a number of available covering entities after the change for the at least one period of time to the number of covering entities specified by the coverage rule.

10. The method of claim 1 wherein automatically generating a notification includes communicating one of an email, a short message service (SMS) message, an instant message, a multimedia message service (MMS) message, a popup window, a page, and a phone call indicating violation of the coverage rule.

11. The method of claim 1 wherein, in response to determining that the change would cause the number of available covering entities to have a predetermined relationship with respect to the number of covering entities required by the coverage rule, automatically adding a coverage-related calendar event to the at least one of the calendars.

12. The method of claim 1 comprising determining a coverage rule for a covered entity based on coverage needs of the covered entity by automatically determining coverage needs for a covered entity.

13. The method of claim 1 comprising receiving calendar information associated with the covered entity and updating the coverage rule based on the calendar information associated with the covered entity.

14. The method of claim 13 wherein receiving calendar information includes receiving one of event information and a period of time associated with the event information and wherein updating the coverage rule includes updating the coverage rule based on the one of event information and the period of time associated with the event information.

15. The method of claim 1 comprising determining whether the change would cause a number of available covering entities for the at least one period of time to have a predetermined relationship with respect to the plurality of covering entities required by the coverage rule without violating the coverage rule.

16. The method of claim 14 wherein, in response to determining that the change would cause the number of available covering entities to have the predetermined relationship, automatically generating a warning notification.

17. The method of claim 1 further comprising sending the notification to at least one notification recipient.

18. A calendar-based coverage monitoring system, the system comprising system components including:
   a rule receiver configured to receive a coverage rule defining at least one covering entity for performing an activity for a covered entity and at least one period of time during which the at least one covering entity is to perform the activity; and
   a rule monitor configured to:
      monitor individual calendars for the at least one covering entity;
      detect a change in one of the calendars;
      determine whether the change causes the coverage rule to be violated; and
      automatically generate a notification indicating violation of the coverage rule in response to determining that the change causes the coverage rule to be violated,
   wherein at least one of the system components comprises at least one electronic hardware component.

19. The system of claim 18 wherein the rule receiver is configured to receive a coverage rule including one of identification of each of the at least one covering entity, identification of a set of covering entities, identification of the covered entity, identification of the activity, and information associated with a required number of covering entities for performing the activity for the covered entity.

20. The system of claim 18 wherein the rule monitor is configured to one of poll for and subscribe to information associated with the individual calendars.

21. The system of claim 18 wherein the rule monitor is configured to monitor individual calendars until the activity is performed.

22. The system of claim 18 wherein the rule monitor is configured to communicate one of an email, a short message service (SMS) message, an instant message, a multimedia message service (MMS) message, a popup window, a page, and a phone call indicating violation of the coverage rule.

23. The system of claim 18 wherein the rule monitor is configured to automatically add a coverage-related calendar event in response to determining that the change would cause the number of available covering entities to have a predetermined relationship with respect to the number of covering entities required by the coverage rule.

24. The system of claim 18 wherein the rule monitor is configured to determine a coverage rule for a covered entity based on coverage needs of the covered entity by automatically determining coverage needs for a covered entity.

25. The system of claim 18 wherein the rule monitor is configured to receive calendar information associated with the covered entity and to update the coverage rule based on the calendar information associated with the covered entity.

26. The system of claim 18 wherein the rule monitor is configured to determine whether the change would cause a number of available covering entities for the at least one period of time to have a predetermined relationship with respect to the plurality of covering entities required by the coverage rule without violating the coverage rule.

27. The system of claim 26 wherein the rule monitor is configured to automatically generate a warning notification in response to determining that the change would cause the number of available covering entities to have the predetermined relationship with respect to the number of covering entities required by the coverage rule without violating the coverage rule.

28. The system of claim 18 wherein the rule monitor is configured to automatically determine coverage needs for a covered entity.

29. The system of claim 18 comprising an availability analysis function configured to analyze calendar information and generate availability information.

30. The system of claim 18 further comprising an action manager configured to send the notification to at least one notification recipient.

31. A calendar-based coverage monitoring system, the system comprising components including:
means for receiving a coverage rule defining at least one covering entity for performing an activity for a covered entity and at least one period of time during which the at least one covering entity is to perform the activity;
means for monitoring individual calendars for the at least one covering entity and detecting a change in one of the calendars;
means for determining whether the change causes the coverage rule to be violated; and
means for automatically generating a notification indicating violation of the coverage rule in response to determining that the change causes the coverage rule to be violated,
wherein at least one of the means includes at least one electronic hardware component.

32. A tangibly embodied computer readable medium containing a computer program, executable by a machine, for determining availability of presentable content via a subscription service, the computer program comprising executable instructions for:
receiving a coverage rule defining at least one covering entity for performing an activity for a covered entity and at least one period of time during which the at least one covering entity is to perform the activity;
monitoring individual calendars for the at least one covering entity and detecting a change in one of the calendars;
determining whether the change causes the coverage rule to be violated; and
in response to determining that the change causes the coverage rule to be violated, automatically generating a notification indicating violation of the coverage rule.

* * * * *